US009906831B2

(12) United States Patent
Chen (10) Patent No.: US 9,906,831 B2
(45) Date of Patent: Feb. 27, 2018

(54) FINGERPRINTING MEDIA CONTENT USING HASHING

(71) Applicant: Sorenson Media, Inc., Draper, UT (US)

(72) Inventor: Juikun Chen, West Jordan, UT (US)

(73) Assignee: Sorenson Media, Inc., Draper, UT (US)

( * ) Notice: Subject to any disclaimer, the term of this patent is extended or adjusted under 35 U.S.C. 154(b) by 0 days.

(21) Appl. No.: 15/138,678

(22) Filed: Apr. 26, 2016

(65) Prior Publication Data

US 2017/0244999 A1 Aug. 24, 2017

Related U.S. Application Data

(60) Provisional application No. 62/299,455, filed on Feb. 24, 2016.

(51) Int. Cl.
*H04N 7/173* (2011.01)
*G06F 7/00* (2006.01)
(Continued)

(52) U.S. Cl.
CPC ..... *H04N 21/4345* (2013.01); *G06F 17/3002* (2013.01); *G06F 17/30038* (2013.01); *G06F 17/3053* (2013.01); *G06F 17/30097* (2013.01); *H04N 21/84* (2013.01); *G06F 17/30109* (2013.01); *G06F 17/30256* (2013.01); *G06K 9/6215* (2013.01); *H04N 2201/3233* (2013.01)

(58) Field of Classification Search
CPC ............ H04N 21/84; H04N 2201/3233; G06F 17/3053; G06F 17/30109; G06F 17/30256; G06F 17/30097; G06K 9/6215
See application file for complete search history.

(56) References Cited

U.S. PATENT DOCUMENTS

2013/0006951 A1* 1/2013 Yu ..................... G06F 17/30784
707/706
2015/0022675 A1 1/2015 Lord et al.
(Continued)

OTHER PUBLICATIONS

International Search Report and Written Opinion for the related Application No. PCT/US2017/018189 dated May 8, 2017.

*Primary Examiner* — James R Marandi
(74) *Attorney, Agent, or Firm* — Honigman Miller Schwartz and Cohn LLP (57) ABSTRACT

A server device includes memory to store: a database of frame fingerprints ordered sequentially by media item number and frame number for media items, and a hash table containing (key, value) entries each including a hashed frame fingerprint and index number(s) to the database. A processor coupled to the memory is to, for an input set of hashed frame fingerprints, select a most recent hashed frame fingerprint. The processor performs a lookup with the most recent hashed frame fingerprint to identify a plurality of index numbers from a matching entry. The processor retrieves a target plurality of frame fingerprints from the database using each of the plurality of index numbers as a starting point; calculates a rank distance between the input set and each respective target plurality of frame fingerprints; and selects the target plurality of frame fingerprints for which the rank distance is shortest, to identify a media item.

14 Claims, 5 Drawing Sheets

(51) Int. Cl.
    *G06F 17/30*     (2006.01)
    *H04N 21/434*     (2011.01)
    *H04N 21/84*     (2011.01)
    *G06K 9/62*     (2006.01)

(56) References Cited

U.S. PATENT DOCUMENTS

2015/0227557 A1*    8/2015    Holzschneider .. G06F 17/30256
                                                                             382/218
2015/0227796 A1    8/2015    Holzschneider et al.

* cited by examiner

FINGERPRINTING MEDIA CONTENT USING HASHING

CROSS-REFERENCE TO RELATED APPLICATION

This application claims the benefit of U.S. Provisional Application No. 62/299,455, filed Feb. 24, 2016, the entire disclosure of which is incorporated herein by this reference.

BACKGROUND

Media consumption devices, such as smartphones, tablets, and smart televisions (TVs), can access digital content and receive data, such as streaming media, from data networks (such as the Internet). Streaming media refers to a service in which media content can be provided to an end user (upon request) over a telephone line, a cable, the Internet, and so forth. For example, a user can view a movie without having to leave a residence by requesting the movie via a media consumption device and viewing the movie as it is streamed over the Internet. In another example, users can access various types of educational content, such as video lectures, without having to physically attend a school or educational institution.

As the number of media consumption devices continues to increase, media content generation and delivery similarly increases. With an increase in use of media consuming devices to access streaming media, content or network providers can distribute contextually-relevant material to viewers that are consuming streaming media. For example, local broadcasters can integrate contextually-relevant advertisements and interactive content with streaming media.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

In an embodiment of the present disclosure, various computing devices, apparatuses and corresponding methods can use hash functions in generating fingerprints for matching within a database using a hash table, to reduce time and resources required to find a fingerprint match within a large database. In one example, an automatic content recognition (ACR) server device can include memory in which is stored the database of hashed frame fingerprints ordered sequentially by media item number and frame number for a plurality of media items. A hash table, also stored in the memory, contains (key, value) pair entries each including a hashed frame fingerprint and one or more index number to the database. Once hashed and combined by an ACR device, neighboring frame fingerprints of an unidentified media item can be sent as an input set to the ACR server for identification.

In one embodiment, a processor coupled to the memory of the ACR server can, for an input set of hashed frame fingerprints, select a most recent hashed frame fingerprint. The processor can perform a lookup in the hash table with the most recent hashed frame fingerprint to identify a plurality of index numbers from a matching (key, value) entry of the hash table. That is, in some cases, there will be more than one media item corresponding to the searched for most recent hashed frame fingerprint.

The processor can then retrieve a target plurality of frame fingerprints (each of which can also be hashed with the same hash function) from the database using each of the plurality of index numbers as a starting point. The processor can then determine a rank distance between the input set and each respective target plurality of frame fingerprints, and select the target plurality of frame fingerprints for which the rank distance is shortest, to identify a media item corresponding to the input set of hashed frame fingerprints. For example, the processor can use the selected target plurality of frame fingerprints to identify the media item from which the input set of hashed frame fingerprints originated. In this way, automatic content recognition can be efficiently performed on behalf of a requesting media device without having to search every record in the database until a match is found. Use of hashing and a hash table lookup allows for a consistent search time regardless of the number of media items and fingerprints stored in the database, as will be discussed in more detail.

Currently, there are several hundred program choices offered by cable television (TV) providers and satellite providers. In addition, there are over one hundred major television market areas with dozens of local television channels. Content feeds can be generated at a central location and distributed to a variety of locations. For example, a television channel can be distributed from a content provider to a number of network providers. The network providers can be local broadcasters, multi-channel networks, and other content owners or distributors.

The word "content" can be used to refer to media. The word "content" can also be a specific term that means the subject matter of the medium rather than the medium itself. Likewise, the word "media," "media item," and some compound words that include "media" (e.g., media, media item, or hypermedia) are instead referring to content, rather than to the channel through which the information is delivered to the end user/audience. An example of a type of content commonly referred to as a type of media is a "motion picture" referred to as "a film."

Media content broadcasting or streaming, such as TV show broadcasting or internet show broadcasting, can be an engaging venue to advertise products and services, provide information to viewers, or any combination thereof. To create revenue to provide numerous programming choices, content providers (such as television networks) can insert advertisements (or ads) into the media content. Conventionally, advertisers have relied on sending one media stream to all the viewers of a channel, with the only targeting being performed by the local broadcasters based on an audience analysis and ratings providers, such as The Nielsen Company®.

While advertising can be an engaging venue to advertise products or services, traditional media consumption advertising lacks targeted and personalized advertising. Broadcasters want to know what programs or channels individual viewers are watching and when they are watching the programs so that subject matter and timing of ads or commercials associated with those programs can be used to accurately target viewers. For example, broadcasters want to target ads and other non-commercial information to viewers to maximize a positive effect of the ads and the non-commercial information. In one example, a positive effect of the ads on a viewer is that the viewer buys a product or service shown in the ad, e.g., converting the ads into sales. Non-commercial information can include news alerts, announcements, educational information, and so forth, which can be valued by many viewers who can watch certain programs or channels more often as a result.

To increase an impact and effectiveness of ads, an advertiser can be interested in targeting particular advertisements to particular sets of viewers, such as a viewer of a selected demographic or location. The advertiser can be interested in interacting with the targeted viewer when the targeted viewer sees the targeted advertisement. For example, a content provider can generate a media item that is relevant to media content being viewed by a viewer. Where consumers of the media items generally tend to select media items that are interesting to them, identifying the media content for linking ads to the media content can enable advertisers to direct their ads to consumers who are interested in a particular topic.

Described herein are methods, systems, and devices for identifying media content or a media item that is being displayed to a viewer. An automatic content recognition (ACR) device can identify media content using content fingerprinting. Content fingerprinting can be performed by the processing device by identifying, extracting, and possibly compressing fingerprint components of media content to then identify the media content by its specific "fingerprint." In one example, fingerprint components (such as frames) can be visual video features such as key frame analysis, colors, and motion changes during a video sequence. In another example, fingerprints can be scores or subcomponents of an audio recording or other type of media. An advantage of content fingerprinting can be to provide viewers with contextually-relevant material that includes targeted and/or personalized advertising as well as an interactive viewing experience.

Figure 1:
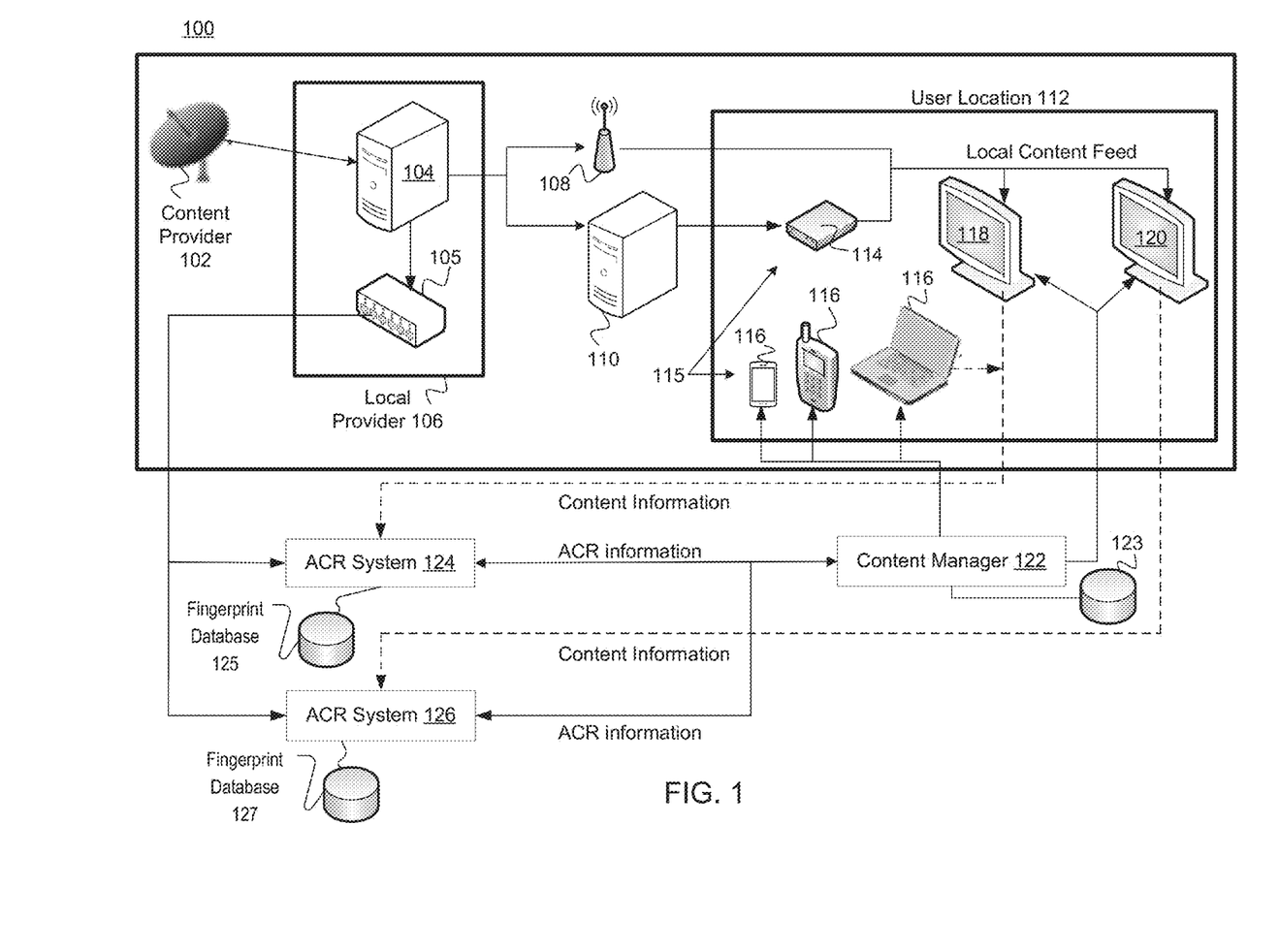
FIG. 1 illustrates a system diagram of a content distribution network according to an embodiment of the present disclosure.

FIG. 1 illustrates a system diagram of a content distribution network 100 according to one embodiment. In the content distribution network 100, a content provider 102 can broadcast a content feed to a local provider 106. The local provider 106 can include a headend 104 and an ACR fingerprinter server 105. The headend 104 of the local provider 106 can receive a content feed from the content provider 102. The headend 104 can generate a local content feed based on the received content feed. For example, the headend 104 can be a local affiliate broadcaster receiving a network channel with programming and advertisements from a national or global broadcaster. In one example, the headend 104 can be a source of a broadcast feed prior to the broadcast facility transmitting the broadcast feed. In another example, the headend 104 can be a distribution amplifier. The distribution amplifier can receive a source feed and it can create multiple outputs for different devices from the same source feed. The output feeds can be routed to various distribution outlets, such as for broadcast over the air (OTA), delivery to cable providers, delivery to satellite providers, and/or delivery to online streaming providers.

The headend 104 can communicate the local content feed to the ACR fingerprinter server 105, an over-the-air (OTA) broadcaster 108, and/or a multichannel video programming distributor (MVPD) 110. In one example, the ACR fingerprinter server 105 can be a device that is installed in a broadcast facility. The ACR fingerprinter server 105 can receive a feed from the headend 104. The ACR fingerprinter server 105 can fingerprint the feed and send the fingerprints to a cloud-based web service. In one embodiment, the ACR fingerprinter server 105 can be installed inside the broadcast facility in order to fingerprint a feed in advance of that feed being delivered to a display device, such as a television (TV).

The OTA broadcaster 108 and/or the MVPD 110 can communicate the local content feed to electronic devices 115, also referred to as ACR devices 115 herein. Some examples of the electronic devices 115 include electronic devices 118 and 120, a set top box 114 that streams media content to the electronic devices 118 and 120, as well as other devices 116 through which the user can stream the local content feed, e.g., wirelessly.

In one example, the OTA broadcaster 108 can broadcast the local content feed using traditional local television channels or radio channels. In this example, the electronic devices 118 and 120 can include antennas (such as TV antennas or radio antennas) to receive the local content feed. In another example, the MVPD 110 (such as a cable broadcaster or a satellite broadcaster) can communicate the local content feed to a set top box 114. In this example, the set top box 114 can format the content feed for the electronic devices 118 and 120 and can communicate the formatted content feed to the electronic devices 118 and 120. The electronic devices 118 and 120 can include a display device, such as a television screen or a touch screen, to display the local content to a viewer. Various components of the content distribution network 100 can be integrated or coupled to the electronic devices 118 and 120. For example, the electronic devices 118 and 120 can be smart televisions that include the antennas, the set top box 114, and the display device in a single unit.

The ACR fingerprint server 105 can analyze the local content feed and determine fingerprint information (e.g., fingerprints). The ACR fingerprint server 105 can communicate the fingerprints to the ACR system 124 or 126. The ACR systems 124 and 126 can be different ACR systems selected by device manufacturers, such as smart TV manufacturers. In one example, the ACR system 124 or 126 can include processing logic or a processing device to execute instructions or perform processes. In another example, the ACR systems 124 and 126 can be ACR web services for different ACR vendors. The ACR fingerprinter server 105 can enable the use of indexing clients from multiple ACR vendors. For example, different consumer electronics manufacturers (CEMs), such as TV manufactures, can independently select ACR vendors for integration into their electronic devices. To enable ACR-based functionality on a specific CEM's device, an ACR system can index broadcast feeds using ACR vendors that CEMs have selected and integrated on that CEM's televisions. One advantage of integrating multiple ACR vendors onto the ACR fingerprinter server 104 can be to enable entities such as advertisers, advertising agencies, and content providers to interface with a single platform and deliver advanced advertising and content experiences to electronic devices from multiple CEMs.

In one example, the ACR system 124 can be coupled to a fingerprint database 125. In another example, the ACR system 126 can be coupled to a fingerprint database 127. The fingerprint databases 125 and 127 can store fingerprints and media content. The content manager 122 can be a server component that receives messages from the ACR system 124 and/or 126. The messages can include information indicating media content that the electronic device 118 or 120 is going to display or is currently displaying. In one example, in response to the content manager 122 receiving the message, the content manager 122 can record an impression or association between the electronic device 118 or 120 and the media content stored in the database 123. In another example, in response to the content manager 122 receiving the message, the content manager 122 can query or search the database 123 for available content overlays for the media content. The content manager 122 filters the content overlays using the device information for the electronic device 118 or 120. The content manager 122 can send a content overlay, via the ACR system 124 or 126, to the electronic device 118 or 120. In one embodiment, the electronic device 118 or 120 can display the content overlay to a viewer. In another embodiment, the electronic device 118 or 120 can replace the media content with the overlay content and display the overlay content to a viewer. In another example, the ACR system 124 or 126 can cause triggers to be displayed on the electronic device 118 or 120. The electronic device 118 or 120 can recognize the triggers and send a request to the content manager 122 to record an impression or association between the electronic device 118 or 120 and the media content in the database 123. For example, the electronic device 118 or 120 can send a request to the content manager 122 to record whether a viewer changes a channel when the electronic device 118 or 120 displays select media content.

Figure 2:
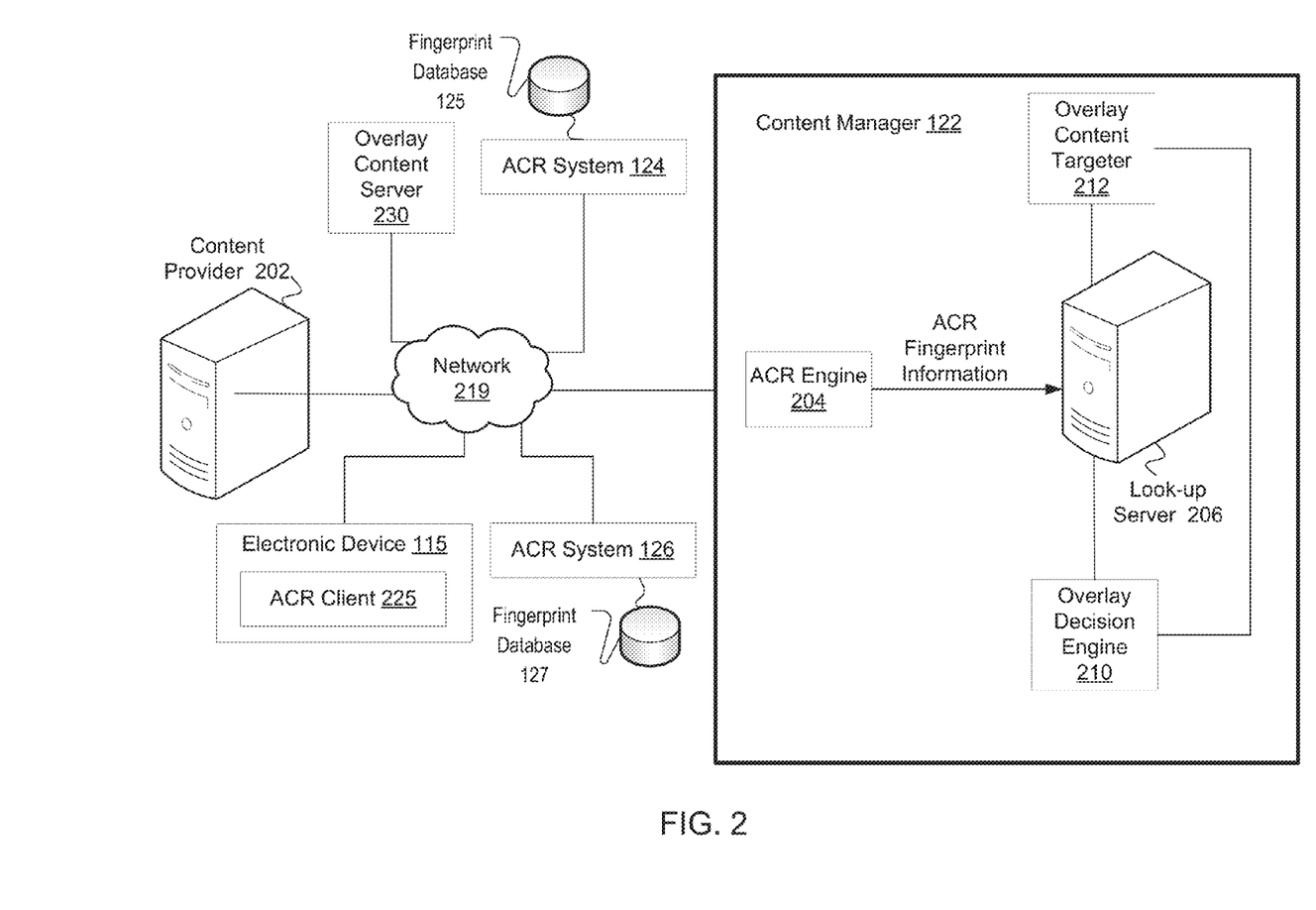
FIG. 2 illustrates a system diagram of a content overlay network with a content manager in communication with an automatic content recognition (ACR) client of an electronic device according to an embodiment of the present disclosure.

With further reference to FIG. 2, the automatic content recognition can be performed in a distributed architecture as described herein. In one embodiment, an ACR client 225 can reside on any of the electronic device 115, 118, or 120. In one embodiment, the ACR client 225 can perform automatic content recognition. In another embodiment, a local ACR system or a local ACR fingerprint matcher integrated with the local ACR system can perform the automatic content recognition. In another embodiment, the ACR client 225 can perform ACR fingerprint matching as described herein. In another embodiment, the ACR client 225 can be a client-side matching component.

The electronic devices 115, 118, or 120 can be a media device, such as a television, mobile phone, or dongle. The ACR client 225 can be software or firmware that executes or runs on the electronic devices 115, 118, or 120. The ACR client 225 can fingerprint media content (such as audio content, video content, closed captions, emergency messages, and so forth) during a playback of the media content. The ACR client 225 can communicate with ACR system 124 or 126 to facilitate identification of content and trigger events to cause the content overlay system to perform dynamic ad replacement and/or superimposing overlay content on top of the media content. The proceeding paragraphs describe the interactions of the ACR client 225 with the ACR fingerprint server 105 in greater detail.

The ACR fingerprint server 105 can analyze the local content feed that can include an ordered sequence of frames from the local content feed and capture fingerprints. The ACR fingerprint server 105 can communicate the fingerprints to the ACR system 124 or 126. The ACR systems 124 and 126 can be different ACR systems selected by device manufacturers, such as smart TV manufacturers. In one example, the ACR fingerprint server 105 can format fingerprints for the different ACR systems 124 and 126. The ACR systems 124 and 126 can establish communication connections with the different electronic devices 115. The electronic devices 115 can communicate fingerprint information to the ACR systems 124 and 126, respectively. When the ACR system 124 or 126 receives ACR fingerprint information from the electronic devices 115, the ACR system 124 or 126 can match the received fingerprints with those generated by the ACR fingerprint server 105. When a match occurs and the ACR system 124 or 126 identifies content, the ACR system 124 or 126 can communicate ACR events to a content manager 122.

In another example, the ACR system 124 or 126 can receive ACR fingerprint information from one of the electronic devices 115 and can match the received fingerprints with those generated by the ACR fingerprint server 105. When a match occurs and the ACR system 124 or 126 identifies content, the ACR system 124 or 126 can notify the electronic device 115 of the ACR events. The electronic device 115 can communicate ACR event information to the content manager 122. Alternatively, or additionally, the ACR system 124 or 126 can directly communicate the ACR events to the content manager 122. The ACR event fingerprint information can include: information indicating the advertisements in the local content feed; information indicating selected or flagged content in the local content feed; or information indicating a change of a content channel at the electronic device 115 to new media content.

The ACR event information from the different ACR systems 124 and 126 can be in different formats and the content manager 122 can normalize the data into a common format. The content manager 122 can store the normalized data into a database 123. For example, the content manager 122 can receive disparate data sets from the ACR systems 124 and 126, the disparate data sets including similar but not identical data, such as data with the same content but formatted differently. The content manager 122 can process and reformat the disparate data sets to create a single data model or format (e.g., reformatted data sets). The content manager 122 can store the reformatted data sets in the database 123.

In one embodiment, to normalize disparate data sets from ACR systems 124 and 126, the content manager 122 can remove or filter data in the data sets. For example, some data sets can include fields or data that can be irrelevant to the content manager 122. In this example, the content manager 122 can remove or filter the irrelevant data. In another embodiment, to normalize the disparate data sets from ACR systems 124 and 126, the content manager 122 can map fields of the data sets. For example, when the content manager 122 receives a first data set from the ACR system 124 and a second data set from the ACR system 126, at least some of the data fields of the first data set and the second data set can be common to both the first data set and second data set. However, the common data fields can be located at different places in the first data set and second data set. In this example, the content manager 122 can map the different data fields of the first data set and second data set to normalized fields and have the same data fields in the same data field locations in the database 123.

In another embodiment, to normalize disparate data sets from the ACR systems 124 and 126, the content manager 122 can derive data from the data sets. For example, data from the ACR systems 124 and 126 may not include all of the fields that are needed to fill the data fields in the database. However, the content manager 122 can use other fields in the data sets from the ACR systems 124 and 126 to derive data for these data fields.

In one example, the database 123 can include data fields for such as a state in a country field, a designated market area (DMA), and a county and/or city field but the data sets from the ACR systems 124 and 126 can only include zone improvement plan (ZIP) codes. In this example, the content manager 122 can use the ZIP codes to derive data for the fields in the database. In another example, the data set can not include any geographic location information, but can include an internet protocol (IP) address of the ACR systems 124 and 126. In this example, the content manager 122 can use a geo-IP lookup service to derive the state, DMA, county, city and ZIP code information.

In another example, the database 123 can include demographic fields such as an age field, a gender field, a household income field, and so forth. However, the data sets from the ACR systems 124 and 126 may not include the demographic fields or demographic data. In this example, the ACR systems 124 and 126 can provide the content manager 122 with the IP address of the electronic devices 115. The content manager 122 can use the IP addresses to determine the demographic data to populate the data fields in the database.

In another example, a field in a first data set from the ACR system 124 can include local time zone information, such as a mountain daylight time (MDT) zone, and a second data set from the ACR system 126 can include information from another time zone, such as a coordinated universal time (UTC) zone. The database can store all data using the UTC and the content manager 122 can convert the local time to UTC before storing the data in the database 123.

In one embodiment, the content manager 122 can use the normalized data to generate reports or data (viewing data) about user's viewing behavior across different ACR technology vendors and smart TV or other Internet-connected video devices. The content manager 122 and the electronic devices 115 can include communications interfaces to communicate information, such as overlay content, between the electronic devices 115 and the content manager 122. In one example, the communication interface can communicate the information using a cellular network and/or a wireless network. In one example, the communication network can be a cellular network employing a third generation partnership project (3GPP) release 8, 9, 10, 11, or 12 or Institute of Electronics and Electrical Engineers, Inc. (IEEE®) 802.16p, 802.16n, 802.16m-2011, 802.16h-2010, 802.16j-2009, 802.16-2009. In another embodiment, the communication network can be a wireless network (such as a network using the Wi-Fi® technology developed by the Wi-Fi Alliance) that can follow an IEEE® standard developed by the Institute of Electrical and Electronics Engineers, Inc., such as the IEEE 802.11-2012, IEEE 802.11ac, or IEEE 802.11ad standards. In another embodiment, the communication network can deploy Bluetooth® connections developed by the Bluetooth Special Interest Group (SIG) such as Bluetooth v1.0, Bluetooth v2.0, Bluetooth v3.0, or Bluetooth v4.0. In another embodiment, the communication network can be a Zigbee® connection developed by the ZigBee Alliance such as IEEE 802.15.4-2003 (Zigbee 2003), IEEE 802.15.4-2006 (Zigbee 2006), IEEE 802.15.4-2007 (Zigbee Pro).

In one example, the content manager 122 can instruct the electronic devices 115 to replace portions of the local content feed received from the OTA broadcaster 108 or the MVPD 110 with overlay content. In another example, the content manager 122 can instruct the electronic devices 115 to overlay or superimpose overlay content onto portions of the local content feed. The content manager 122 can aggregate ACR event information across multiple ACR systems 124 and 126 and can communicate overlay content to different electronic devices 115 (such as electronic devices from different device manufacturers).

The content manager 122 can also establish communication connections with other devices 116. In one example, the other devices 116 can communicate with the electronic devices 118 and 120 and provide an additional screen (e.g., a second screen) to display overlay content. For example, the electronic devices 118 and 120 can receive the local content feed from the OTA broadcaster 108 or the MVPD 110 and display the local content feed to a viewer. The other devices 116 can also communicate ACR event information to the ACR systems 124 and 126 when an ACR event occurs, as discussed in the preceding paragraphs. When the content manager 122 receives the ACR event information, the content manager 122 can communicate overlay content to the other devices 116.

In one example, the electronic devices 118 and 120 can continue to display the local content feed while the other devices 116 display the overlay content. In another example, the electronic devices 118 and 120 and the other devices 116 can both display the overlay content. In another example, the electronic devices 118 and 120 and the other devices 116 can display a portion of the overlay content and a portion of the local content feed. In another example, the electronic devices 118 and 120 and the other devices 116 can display different local content feeds and different overlay content.

In another example, the electronic devices 118 and 120 and/or the other devices 116 can display the overlay content at the time the electronic devices 118 and 120 and/or the other devices 116 receive the overlay content. In another example, the electronic devices 118 and 120 and/or the other devices 116 can delay displaying the overlay content for a threshold period of time. In one embodiment, the threshold period of time can be a predefined period of time. In another embodiment, the content manager 122 can select a period of time for the electronic devices 118 and 120 and the other devices 116 to delay displaying the overlay content.

FIG. 2 illustrates a system diagram of a content overlay network 200 with a content manager 122 in communication with an ACR client 225 of an electronic device 115 that performs fingerprint matching locally on the electronic device 115 according to one embodiment. Some numbers in FIG. 2 are similar to some numbers in FIG. 1 as noted by similar reference numbers unless expressly described otherwise.

A content provider 202 can stream media content to the electronic device 115 over a network 219, where the content manager 122 can intercept the streaming before or simultaneously with the content provider 202 streaming of the media content to the electronic device 115. For example, the content manager 122 can receive a copy of the media content and the electronic device 115 can receive the media content. The content manager 122 can also communicate with an overlay content server 230. In one example, the content manager 122 can send the overlay content server 230 an ad call that requests an ad be served with the media content to target the subject matter of the media content and/or interests of a viewer. In another example, the content manager 122 can send the overlay content server 230 an ad call that requests an ad be served as an overlay to the media content to target the subject matter of the media content and/or interests of the viewer.

The content manager 122 can include an ACR engine 204, a look-up server 206, an overlay decision engine 210, and an overlay content targeter 212. The content provider 202 can upload overlay content to the ACR engine 204. In one embodiment, the ACR engine 204 can receive ACR event information from the electronic devices 115. The ACR engine 204 can determine events associated with the fingerprints to enable the content manager 122 to select overlay content based on the events. In another embodiment, the ACR engine 204 can fingerprint the overlay content. For example, the ACR engine 204 can generate a fingerprint for a frame of a feed by performing a discrete cosine transform (DCT) of the frame and designating a subset of the resulting coefficients (e.g., the low-frequency coefficients) as the fingerprint. In one embodiment, the ACR engine 204 can generate fingerprints by fingerprinting every frame of a feed. In another embodiment, the ACR engine 204 can generate fingerprints by fingerprinting every other frame of the feed. In another embodiment, the ACR engine 204 can generate fingerprints by fingerprinting a sequence of frames. In another embodiment, the ACR engine 204 can generate fingerprints by periodically fingerprinting the frames. In another embodiment, fingerprints can be generated by fingerprinting the frames at predetermined times.

The ACR engine 204 can communicate ACR fingerprints to the look-up server 206. The look-up server 206 can look-up media content in a database stored at the look-up server 206. In one embodiment, the look-up server 206 identifies media content. In another embodiment, the look-up server 206 identifies a location within the media content corresponding to an ACR event received from the ACR system 124 or 126. In one embodiment, the ACR event can be when an input device (such as a remote) changes a media content channel on an electronic device to new media content (e.g., changing from TV channel 3 to TV channel 4). In another embodiment, the ACR event can be when an ACR system 124 or 126 matches a fingerprint for the media content with a tagged fingerprint in the series of fingerprints from the ACR system 124 or 126 that the electronic device 115 is currently displaying.

Each fingerprint for a segment of the feed can be associated with a time stamp. The time stamp can belong to individual frames of the segment of the feed as the ACR engine 204 receives the frames. The time stamp can be a frame number within the feed with an arbitrary starting point. The look-up server 206 can store the fingerprints in association with their respective time stamps. In one embodiment, the time stamps can have a microsecond format. The overlay content targeter 212 can use the time stamp to identify an ad to overlay or replace a media content with on a frame-by-frame basis because the fingerprints are time stamped at a microsecond level. In one embodiment, the overlay content targeter 212 can receive requests from the ACR engine 204 for overlay content to superimpose onto media content. The ACR engine 204 can look up a list of different overlay content or replacement videos associated with the media content in a database and send the list to the overlay content targeter 212. The overlay content targeter 212 can select overlay content or a replacement video from the list and send the overlay content or the replacement video to the ACR engine 204 for the on the electronic devices 115 to display.

In another embodiment, the ACR engine 204 interacts with the ACR client 225 of the electronic device 115. The ACR client 225 can include processing logic or a processing device to execute instructions or perform processes. The electronic device 115 can include an ACR client 225 that can communicate viewer fingerprint information to the look-up server 206 periodically or continuously, such as continuously while an ACR event occurs. The look-up server 206 can determine when there can be a match between the ACR fingerprint information (stored at the look-up server 206, for example) and the viewer fingerprint information. When there is a positive match, the look-up server 206 can communicate a positive match indicator to the ACR client 225. The ACR client 225 can send an overlay request to an overlay decision engine 210 requesting overlay content.

In one example, the overlay request can include a content identifier (ID). In one embodiment, the content ID can be an ID identifying a type of overlay content. In another example, the overlay request can include overlay information or overlay parameters (as discussed in the proceeding paragraphs). In another embodiment, the overlay information can include overlay content or targeting information. In another embodiment, the overlay parameter can include call-to-action options. In one example, the call-to-action options can include configuration information for a user interface of the electronic device that receives feedback associated with the overlay content or the media content. In another example, the call-to-action options can include restriction information that restricts selection of overlay content. In one example, the overlay decision engine 210 can use the content ID, overlay information, or overlay parameters to identify overlay content.

In another example, the overlay decision engine 210 can use the content ID, overlay information, and/or overlay parameters to identify an overlay format. The overlay decision engine 210 can compare the content ID, overlay information, or overlay parameters with an overlay database to identify the overlay content and/or the overlay format. A content provider or an advertiser can use a graphical user interface (GUI) or other interface to send and update the overlay database with new overlay content and/or overlay formats on a periodic or continuous basis.

When the overlay decision engine 210 identifies the overlay content, the overlay decision engine 210 can return the overlay content to the electronic device 115. In one example, the overlay decision engine 210 can communicate the overlay content directly to the electronic device 115, such as via a wireless communication network. In another example, the overlay decision engine 210 can communicate the overlay content to the electronic device 115 via a universal resource locator (URL). In one example, when multiple overlay contents match the content ID, overlay information, and/or overlay parameters, the overlay decision engine 210 can select the targeted content overlay that meets a greatest number parameters and/or other information (e.g., greater than the other overlay content). In another example, when multiple overlay contents match the content ID, overlay information, and/or overlay parameters, the overlay decision engine 210 can randomly select an overlay content that meets the parameters and/or other information. In another example, when multiple overlay contents match the content ID, overlay information, and overlay parameters, the overlay decision engine 210 can select predetermined overlay content that matches the content ID, overlay information, and/or overlay parameters. The overlay content can be populated with dynamic content (e.g., content that can be updated or refreshed at periodic intervals). The dynamic content can be stored in a local database or an external system.

The ACR client 225 of the electronic device 115 can superimpose overlay content over the media content of the content feed when the ACR fingerprint information matches the user fingerprint information. In one example, the electronic device 208 can superimpose overlay content over the media contact of the content feed in a hypertext markup language (HTML) browser. In another example, the electronic device 208 can superimpose overlay content over the media content of the content feed from an OTA broadcaster or a cable broadcaster. When the electronic device 115 superimposes overlay content onto the media content, a display of the electronic device 115 can display the overlay content to the viewer. In one example, the overlay content can include one or more call-to-action options that the electronic device 115 displays to a user. In this example, the user can interact with the overlay content using an input device (such as a TV remote, keyboard, a smartphone, or a tablet) to create feedback information. The ACR client 225 can communicate the feedback information to an overlay content targeter 212. The overlay content targeter 212 can analyze the feedback information to determine desired information, such as a user interest level in the overlay content.

In one embodiment, the ACR client 225 monitors the content feed to determine when the fingerprints of the overlay content and the media content of the content feed cease to match. In another embodiment, the ACR client 225 determines when a threshold period of time expires after the fingerprints of the overlay content and the media content of the content feed match. In one example, when the overlay content and content feed match ceases and/or a threshold period of time expires, the electronic device 115 can cease to superimpose the overlay content for display on the electronic device 115.

In one embodiment, the ACR client 225 can perform the fingerprint matching locally for a portion of the fingerprints. In another embodiment, the ACR client 225 can perform all fingerprint matching locally. For example, the ACR client 225 can perform the fingerprinting locally on the electronic device 208, instead of on a server, such as the look-up server 206. The ACR operations described can be used in context other than the overlay system context. For example, the local ACR fingerprint matching by the ACR client 225 can be used in other systems.

Fingerprinting media content while the media content is broadcast and displayed to a viewer (e.g., live processing) or within a selected threshold period of time after the media content is broadcast or streamed (e.g., substantially live processing) can enable an ACR device (such as can be integrated within the electronic device 115 of FIGS. 1-2) to adjust for viewer behavior while the viewer can be viewing the media content (e.g., live or substantially live adjusting). In one example, the viewer behavior can be changing or pausing a channel, adjusting a volume of the media consumption device, changing menu settings, and so forth. In another example, the user behavior can be viewing time-shifted content.

To perform the live processing or the substantially live processing, the ACR device can identify the media content (e.g., media items) displayed on a media device by generating fingerprints for frames of the media content being displayed, and requesting an ACR system to match these frame fingerprints with those stored in a fingerprint database using a searching algorithm. In one example, this fingerprint database can include millions of frame fingerprints from a variety of media content, e.g., from a list or group of different media items. For example, the database can include thousands of fingerprints for an hour-long television show or can include fingerprints from hundreds of shows. Comparing and matching fingerprints from the media content with each frame fingerprint in the database would be time consuming and inefficient.

Figure 3A:
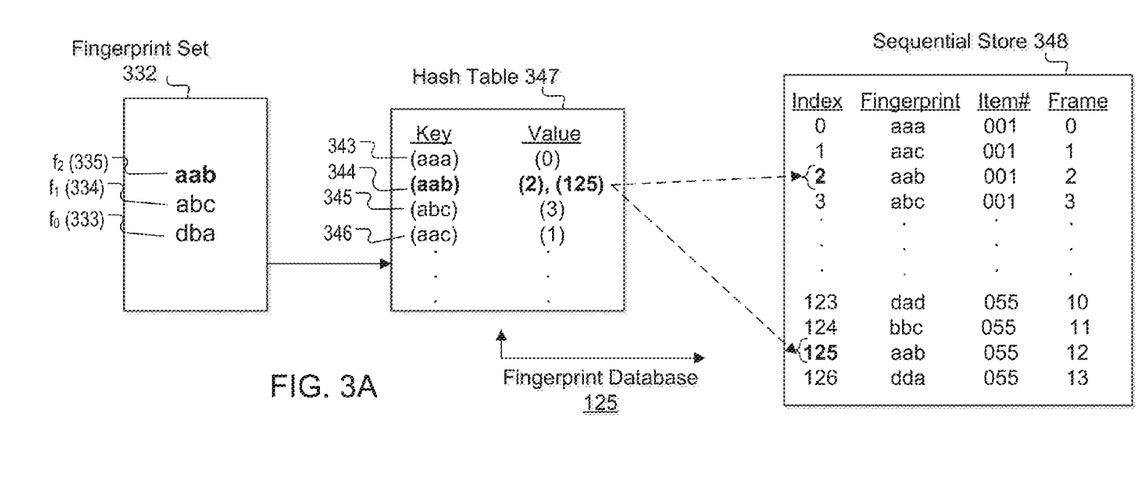
FIG. 3A illustrates an input set of hashed frame fingerprints and a fingerprint database according to an embodiment of the present disclosure.

FIG. 3A illustrates an input set 332 of hashed frame fingerprints 333-335 of an unidentified media item and an embodiment of a fingerprint database 125 according to the present disclosure. In this example, the fingerprint database 125 includes a hash table 347 and a sequential store 348 stored in memory of the ACR system 124 or 126. To efficiently find a match between the fingerprints from the media content, e.g., an input set of hashed frame fingerprints, and stored frame fingerprints from lists of media items, the ACR device can use a hash map by way of a hash table lookup. The hash table 347 can be a data structure used to implement an associative array that includes mapping keys to values. In the present disclosure, the keys may be individual, hashed frame fingerprints and values may be indexes into the fingerprint database 125. A hash function can be used to compute an index into an array of slots of the hash table 347 from which a desired fingerprint can be found.

For example, hash functions accelerate table or database lookups by detecting duplicate records in a large file Hash functions are primarily used in hash tables, to quickly locate a data record given its search key (or headword). Specifically, the hash function can be used to map the search key to an index where the index gives the place in the hash table where the corresponding record should be stored in a database.

In one embodiment, the current hash function can assign each key to a numbered slot in the hash table. When the ACR device searches the hash table, the average cost (number of instructions) for each lookup is independent of the number of entries stored in the hash table. An advantage of using hash mapping to match the media content fingerprints with stored frame fingerprints is that rather than searching the databases using an O(n) algorithm (e.g., a linear algorithm), where "n" is the number of elements in the set to be searched and can be hundreds of millions of fingerprints, hash mapping can provide a O(1) algorithm that is constant, e.g., independent of the size of "n" in the O(n) algorithm.

Where the searching and matching of the media content fingerprints with the stored frame fingerprints is constant, the search time for automatic content recognition while using hash mapping is reduced to a constant search time regardless of the size of the fingerprint database 125. For example, the fingerprint database 125 can include seven million entries of fingerprints associated with different frames for a variety of videos. In one embodiment, when the ACR device uses an O(n) algorithm to search the entries in the database, the ACR device may have to search through all or a relatively large portion of the seven million fingerprints until a match is located. In another embodiment, when hash mapping (e.g., an O(1) algorithm) is used to search a hash table indexed to the fingerprint database, the search time is reduced and is constant regardless of the size of the fingerprint database 125.

With further reference to FIG. 3A, the input set 332 of frame fingerprints generated by the ACR device (such as any electronic device 115 from FIGS. 1-2) can include a specific number (e.g., X) of hashed frame fingerprints 333-335 for an unidentified media item. The input set 332 can include more or fewer frames in various embodiments, and the choice of three hashed frame fingerprints being for purposes of explanation only. Each hashed frame fingerprint may be an ordinal fingerprint containing a list of ordinal values resulting from performing a hash function on a corresponding frame fingerprint. These hashed frame fingerprints 333-335, as combined into the input set 332, can include, in one example, a series of neighboring fingerprints each hashed with a hash function. The series of neighboring fingerprints may be ordered chronologically, but can be direct neighbors or spaced out as every other fingerprint or the like.

The hash table 347 of the fingerprint database 125 can include a list of (key, value) pair entries 343-346 each containing a hashed frame fingerprint, "f," and an index value ("i") pointing to at least one slot in the sequential store 348, e.g., (f,i). The hashed frame fingerprint of each entry may be generated by performing the hash function on an individual fingerprint, e.g., hashed with the same hash function as applied to the frame fingerprints of the input set 332, thus providing for a match to incoming hashed frame fingerprints. Each entry in the hash table 347 may map to one or more indexed slots of the sequential store 348 of the fingerprint database. For example, while often a hashed frame fingerprint will map to a single indexed slot (e.g., "aaa" to index "0"), sometimes the hashed frame fingerprint, acting as the key search to the hash table 347, will map to more than one indexed slot in the sequential store 348 based on operation of the hashing function. In the illustrated example, hashed frame fingerprint "aab" maps to both index "2" and index "125" in the sequential store.

The sequential store 348 of the fingerprint database 125 can include a number of entries, each individually indexed. Each entry in the sequential store 348 can be represented by a tuple <f,v,m> where "f" is the frame fingerprint (which can also be hashed with the same hash function), "v" is a media item number (such as a video number), and "m" is a frame number. For example, <1234567890, 001, 2> can refer to an ordinal-valued fingerprint "1234567890" of frame number "2" in a video identified as "001." In FIGS. 3A and 3B, the frame fingerprints are illustrated as alphabetic sequences for ease of explanation of the tuples and the present methods, but these alphabetic sequences are understood to represent ordinal numbers as exampled above. In the sequential store 348, the index number of each entry can grow sequentially across a number of media items. The sequential store 348 can include a number of media items (videos, films, programs, audio files or the like) each identified by a unique number. As illustrated, there is an item number "001" which could be a first movie and item number "055," which could be a particular television program that happens to be stored sequentially after video 001. The media items also include individual frames numbered sequentially, e.g., (0, 1, 2, 3 . . . ). While the frame numbers start over for each media item, the index number does not. Instead, the index number can continue to grow sequentially so that each media item and frame number is assigned a different index number.

Figure 3B:
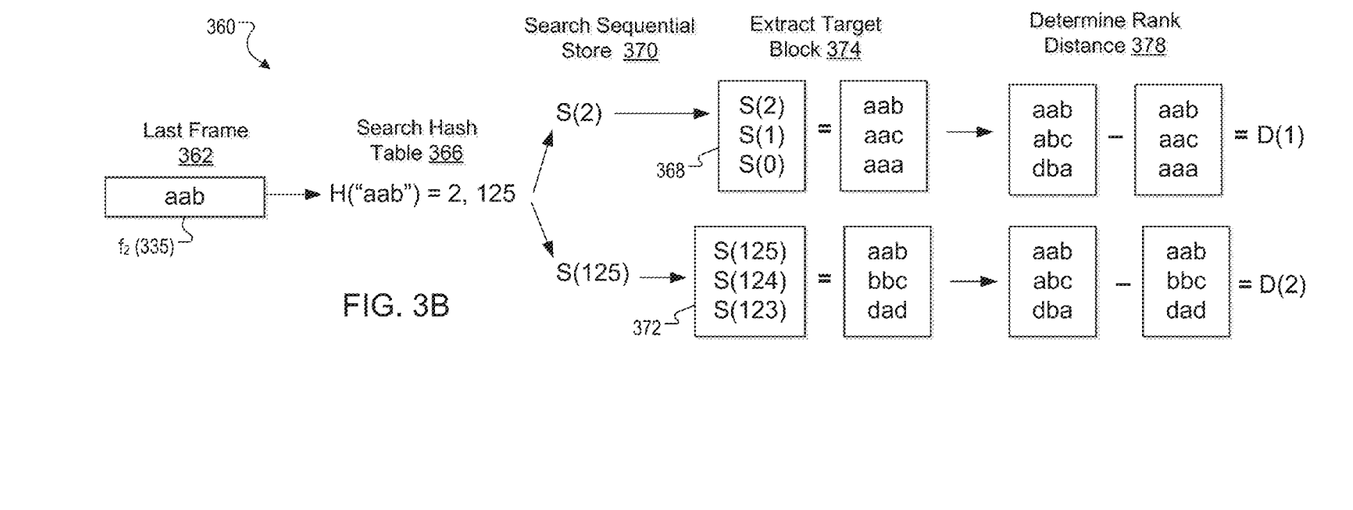
FIG. 3B illustrates a method for identifying a media item according to an embodiment of the present disclosure.

FIG. 3B illustrates a method 360 for identifying a media item using the fingerprint database 125 of FIG. 3A according to an embodiment of the present disclosure. The method 360 can at least partially be performed by processing logic that includes hardware (e.g., circuitry, dedicated logic, programmable logic, microcode, etc.), software (e.g., instructions executed by a processing device), firmware or a combination thereof. The method 360 can be performed by all or part of the content distribution network 100 of FIG. 1. For example, the method 360 can be performed by all or part of the processing logic of any of the electronic devices 115, the ACR system 124 or 126 or the fingerprint database 125 or 127 (FIGS. 1-2).

The ACR system 124 or 125 may, upon receipt of the input set 332 of hashed framed fingerprints, perform a lookup in the hash table 347 to find a (key, value) pair entry of the hash table 347. To do so, the ACR system may identify a last frame in the input set 332, which is a most recent frame fingerprint in the input set of hashed framed fingerprints (362). For example, in an input set, hashed frame fingerprints may be numbered as 0, 1, 2, 3, . . . k, of which the last or most current is "k." In the example of FIG. 3A, the most current hashed frame fingerprint is "aab" 335. The ACR system can then search the hash table 366 to find the index slots in the sequential store 348 for the key value "aab" (366). In this example, the indexes are "2" and "125." The ACR system can then search the sequential store 348 of the fingerprint database 125 for the entries indexed as "2" and "125" (370). As seen in FIG. 3A, while accessing index "2" retrieves a tuple of <aab, 001, 2>, accessing index "125" retrieves a tuple of <aab, 055, 12>.

Once these entries in the sequential store are located, the ACR system can extract a target block (e.g., a target plurality of frame fingerprints) with which to compare to the input set 332 of hashed frame fingerprints (374). This target block can be extracted from the sequential store as the indexed entry plus the frame fingerprints taken backwards in time, e.g., to lower-numbered frames. As shown in FIG. 3B, a target block 368 for index "2" are frame fingerprints in the sequential store indexed as S(2), S(1) and S(0), and a target block 372 for index "125" are frame fingerprints in the sequential store indexed as S(125), S(124) and S(123).

After these target blocks are identified, the ACR system can compute a rank distance between the input set 332 and each of the target block 368 and the target block 372 as, respectively, D(1) and D(2) (378), to determine which target block is most similar to the input set 332. A rank distance can be calculated as a sum of the absolute difference between values of pairwise, rank elements. In the present disclosure, these rank elements can be the ordinal values of the respective frame fingerprints in each of the input set and the target block. While an ordinal rank distance is proposed, in various embodiments the ACR system can alternatively or additionally take a Kendal Tau distance measure, a Euclidean distance, or a distance as between respective frame numbers of the input set and the target block.

Assuming, however and by way of example, use of an absolute distance of pairwise element, D(1) can be calculated as |a−a|+|a−a|+|b−b|+|a−a|+|b−a|+|c−c|+|d−a|+|b−a|+|a−a|, or simplified as |d−a|+2|b−a|, the pairwise sum of the difference between each rank element in the input set 332 and the target block 368. If "a" corresponds to "1," "b" corresponds to "2," and "d" corresponds to "4" in this example, D(1) is equal to five ("5"). D(2) can be similarly calculated as a difference of between ordinal values of respective frame fingerprints of the input set 332 and the target block 372. Once D(1) and D(2) have each been calculated, the ACR system can select the shortest distance (or smallest number) between D(1) and D(2), and identify the input set 332 as coming from the media item corresponding to the target block (e.g., 368 or 372) that resulted in the shorted rank distance. This identity of the media item can be sent back to a requesting ACR device 115 (e.g., as a media item identifier (ID) such as "001" or "055," for example) along with the frame number of the media item corresponding to the current frame 335, "aab."

Figure 4:
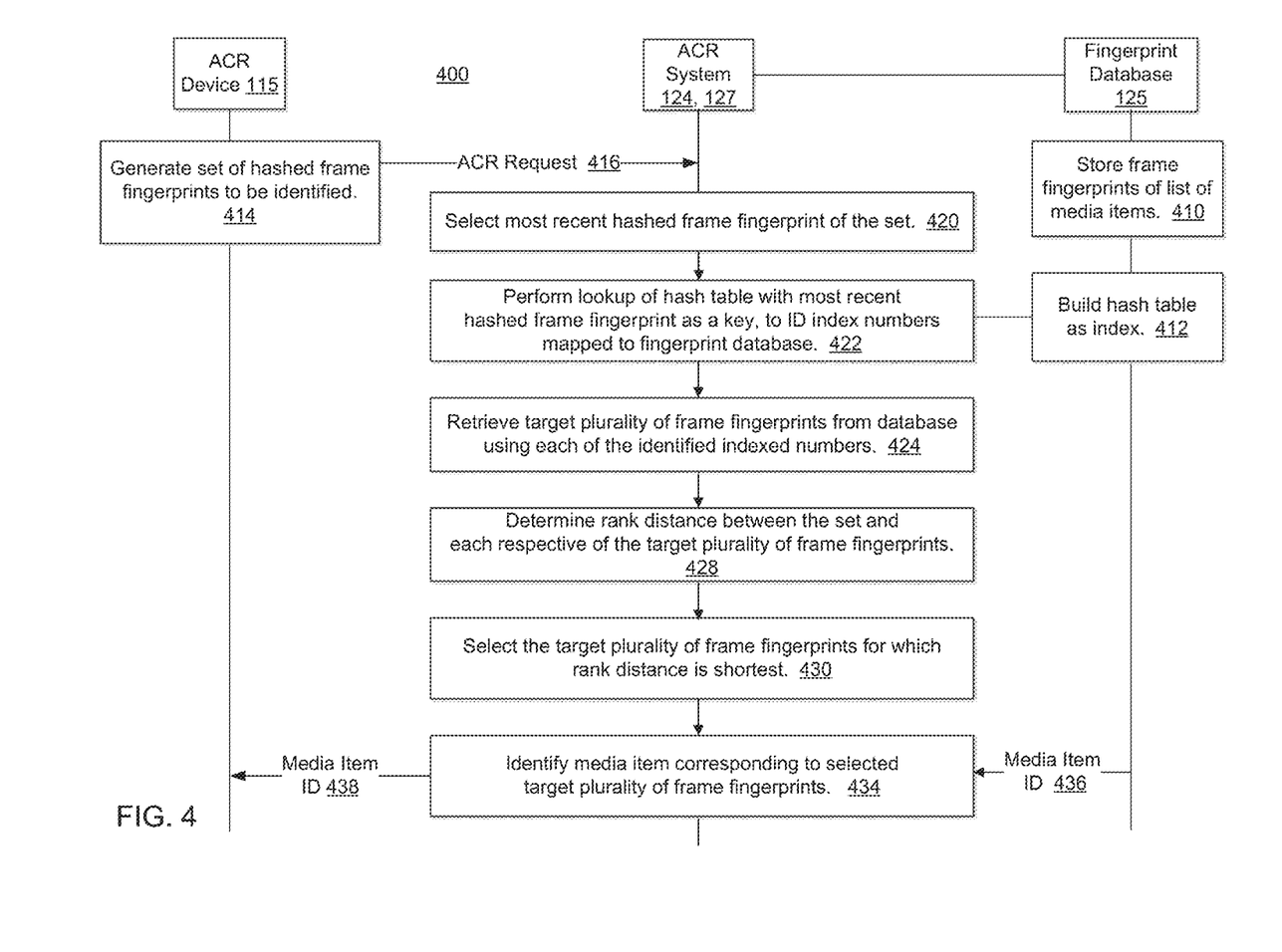
FIG. 4 illustrates a flowchart of a method for identifying a media item according to an embodiment of the present disclosure.

FIG. 4 illustrates a flowchart a method 400 for identifying a media item according to one embodiment. The method 400 can at least partially be performed by processing logic that includes hardware (e.g., circuitry, dedicated logic, programmable logic, microcode, etc.), software (e.g., instructions executed by a processing device), firmware or a combination thereof. The method 400 can be performed by all or part of the content distribution network 100 of FIG. 1. For example, the method 400 can be performed by all or part of the processing logic of any ACR device 115, the ACR system 124 or 126 or the fingerprint database 125 or 127 (FIGS. 1-2).

Referring to FIG. 4, the method 400 begins with storing frame fingerprints of a list of media items in the fingerprint database 125 (410). The method 400 can further include building, by the ACR system, a hash table as an index to a sequential store of the fingerprint database 125 (412). The method 400 can further include generating, by an ACR device 115, an input set of hashed frame fingerprints that are to be identified. The input set can be ordered chronologically such that a last frame fingerprint corresponds to the current frame of the media item being observed.

Accordingly, the method 400 can continue with the ACR system selecting a most recent hashed frame fingerprint from the input set of hashed frame fingerprints (420). The method can further include the ACR system performing a lookup of the hash table with the most recent hashed frame fingerprint as a key to identify a plurality of index numbers from a matching (key, value) entry of the hash table (422). The method can further include retrieving a target plurality of frame fingerprints from the database using each of the plurality of index numbers as a starting point for retrieving (424). In one embodiment, the frame fingerprints moving backwards in time of (e.g., smaller frame numbers) may be retrieved to number the same number of frame fingerprints from the input set of hashed frame fingerprints. The method can further include the ACR system calculating a rank distance between the input set and each respective target plurality of frame fingerprints, e.g., target blocks of frame fingerprints (428). The method can further include the ACR system selecting the target plurality of frame fingerprints for which the rank distance is shortest (430). The method can further include the ACR system identifying a media item corresponding to the selected target plurality of frame fingerprints to identify the media item from which the input set of hashed frame fingerprints originated (434). To execute block 434 of the method, the ACR system may retrieve the item number (or media item ID) from the fingerprint database 125 for the selected target plurality of frame fingerprints (436). The method may further include the ACR system sending the media item ID of the media item to the ACR device 115, which can also include an identity of the frame of the media item corresponding to the most current frame fingerprint (438).

The media item ID can identify the media item being displayed on a display device coupled to the ACR device 118. The use of the ACR system 124 or 126 and the ACR device 115 in the preceding examples and embodiments is not intended to be limiting and other devices and systems can be used in the preceding examples and embodiments. For example, other specifically identified ACR devices such as 118 or 120 can be used in the preceding examples and embodiments.

Figure 5:
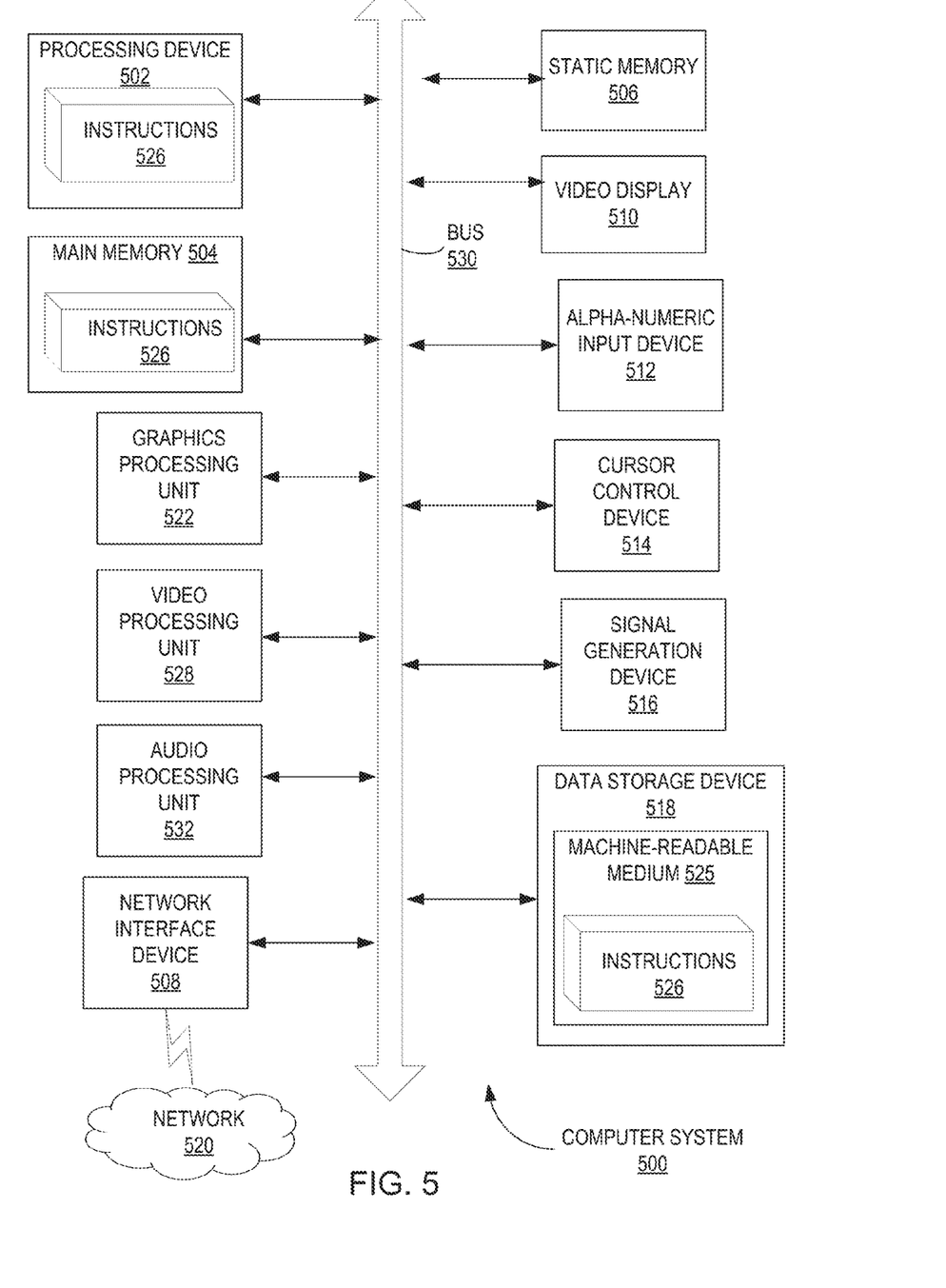
FIG. 5 schematically illustrates a block diagram of a system according to one embodiment of the present disclosure.

FIG. 5 illustrates a diagrammatic representation of a machine in the example form of a computer system 500 within which a set of instructions, for causing the machine to perform any one or more of the methodologies discussed herein, can be executed. In alternative embodiments, the machine can be connected (e.g., networked) to other machines in a LAN, an intranet, an extranet, or the Internet. The machine can operate in the capacity of a server or an electronic device in a client-server network environment, or as a peer machine in a peer-to-peer (or distributed) network environment. The machine can be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 can correspond to the ACR fingerprinter server 105, the content manager 122, the ACR system 124 or 126 or any of the ACR or electronic devices 115 of FIGS. 1-2. The computer system 500 can correspond to at least a portion of a cloud-based computer system.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more processing devices such as a microprocessor, central processing unit, or the like. More particularly, the processing device can be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. In one embodiment, processing device 502 can include one or more processing cores. The processing device 502 is configured to execute the instructions 526 of a mirroring logic stored in the main memory 504 for performing the operations discussed herein.

The computer system 500 can further include a network interface device 508 communicably coupled to a network 520. The computer system 500 also can include a video display unit 510 (e.g., a liquid crystal display (LCD) or a cathode ray tube (CRT)), an alphanumeric input device 512 (e.g., a keyboard), a cursor control device 514 (e.g., a mouse), a signal generation device 516 (e.g., a speaker), or other peripheral devices. Furthermore, computer system 500 can include a graphics processing unit 522, a video processing unit 528, and an audio processing unit 532. In another embodiment, the computer system 500 can include a chipset (not illustrated), which refers to a group of integrated circuits, or chips, that are designed to work with the processing device 502 and controls communications between the processing device 502 and external devices. For example, the chipset can be a set of chips on a motherboard that links the processing device 502 to very high-speed devices, such as main memory 504 and graphic controllers, as well as linking the processing device 502 to lower-speed peripheral buses of peripherals, such as USB, PCI or ISA buses.

The data storage device 518 can include a computer-readable storage medium 525 on which is stored instructions 526 embodying any one or more of the methodologies of functions described herein. The instructions 526 can also reside, completely or at least partially, within the main memory 504 and/or within the processing device 502 during execution thereof by the computer system 500; the main memory 504 and the processing device 502 also constituting computer-readable storage media.

The computer-readable storage medium 525 can also be used to store instructions 526 utilizing logic and/or a software library containing methods that call the above applications. While the computer-readable storage medium 525 is shown in an example embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments can be practiced without these specific details. In some instances, well-known structures and devices are shown in block diagram form, rather than in detail, in order to avoid obscuring the description.

Although the embodiments may be herein described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and can be also used in other devices, such as handheld devices, tablets, other thin notebooks, systems on a chip (SOC) devices, and embedded applications. Some examples of handheld devices include cellular phones, Internet protocol devices, smartphones, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below.

Although the embodiments are herein described with reference to a processor or processing device, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, and/or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or electronic devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments described herein may also relate to an apparatus for performing the operations herein. This apparatus may be specially constructed for the required purposes, or it may comprise a computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various computing systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A server device comprising:
    a non-transitory memory storing instructions and configured to store:
        a database of frame fingerprints ordered sequentially by media item number and frame number for a plurality of media items; and
        a hash table containing a plurality of (key, value) pair entries to the database, each entry including a hashed frame fingerprint and one or more index numbers, each index number mapping the hashed frame fingerprint to a corresponding index slot in the database;
    a network interface configured to receive an input set of hashed frame fingerprints of an unidentified media item from a client device, the hashed frame fingerprints ordered chronologically by frame number in the input set; and
    a processor operatively coupled to the non-transitory memory and the network interface and configured to execute the instructions, the executed instructions causing the processor to perform operations comprising:
        identifying a most recent hashed frame fingerprint in the input set of hashed frame fingerprints;
        querying the hash table using the most recent hashed frame fingerprint to identify a plurality of index numbers from the (key, value) pair entry of the hash table that matches the most recent hashed frame fingerprint;
        for each identified index number, retrieving a corresponding target block of target frame fingerprints from the database, the target frame fingerprints ordered chronologically by frame number and comprising a most recent target frame fingerprint and one or more preceding target frame fingerprints ordered sequentially backwards in time from the most recent target frame fingerprint, the most recent target frame fingerprint having an index slot in the database corresponding to the identified index number;
        determining a corresponding rank distance from the input set of hashed frame fingerprints and each of the retrieved target blocks of target frame fingerprints;
        retrieving a media item identifier from the database for the target block of target frame fingerprints associated with a shortest rank distance from the input set of hashed frame fingerprints, the retrieved media item identifier identifying the media item associated with the input set of hashed frame fingerprints; and
        sending the retrieved media item identifier to the client device via the network interface, the client device in response to receiving the retrieved media item identifier, requesting overlay content from an overlay decision engine for display on a viewer in communication with the client device.

2. The server device of claim 1, wherein a number of frame fingerprints within each corresponding target block of the target frame fingerprints corresponds to a number of the frame fingerprints in the input set of hashed frame fingerprints.

3. The server device of claim 1, wherein determining the corresponding rank distance from the input set of hashed frame fingerprints and each of the retrieved target blocks of target frame fingerprints comprises calculating a sum of an absolute difference between ordinal values of respective hashed frame fingerprints of the input set and the target frame fingerprints for each retrieved target block.

4. The server device of claim 1, wherein the operations further comprise:
when retrieving the media item identifier from the database, retrieving a frame number for the most recent target frame fingerprint from the target block of target frame fingerprints associated with the shortest rank distance; and
when sending the retrieved media item identifier, sending the frame number for the most recent target frame fingerprint to the client device.

5. The server device of claim 1, wherein the plurality of media items comprise videos or television programs.

6. A method comprising:
storing, by a server device of an automatic content recognition (ACR) system, frame fingerprints of a plurality of media items ordered sequentially by frame number within a database of non-transitory memory of the ACR system;
storing, by the server device, a plurality of (key, value) pair entries within a hash table of the non-transitory memory, each entry including a hashed frame fingerprint and one or more index numbers, each index number mapping the hashed frame fingerprint to a corresponding index slot in the database;
receiving, at the server device, an input set of hashed frame fingerprints of an unidentified media item from a media device in communication with the server device, the hashed frame fingerprints ordered chronologically by frame number in the input set;
identifying, by the server device, a most recent hashed frame fingerprint in the input set of hashed frame fingerprints;
querying, by the server device, the hash table using the most recent hashed frame fingerprint to identify a plurality of index numbers from the (key, value) pair entry of the hash table that matches the most recent hashed frame fingerprint;
for each identified index number, retrieving, by the server device, a corresponding target block of target frame fingerprints from the database, the target frame fingerprints ordered chronologically by frame number and comprising a most recent target frame fingerprint and one or more preceding target frame fingerprints ordered sequentially backwards in time from the most recent target frame fingerprint, the most recent target frame fingerprint having an index slot in the database corresponding to the identified index number;
determining, by the server device, a corresponding rank distance from the input set of hashed frame fingerprints and each of the retrieved target blocks of target frame fingerprints;
retrieving, by the server device, a media item identifier from the database for the target block of target frame fingerprints associated with a shortest rank distance from the input set of hashed frame fingerprints, the retrieved media item identifier identifying the media item associated with the input set of hashed frame fingerprints; and
sending the retrieved media item identifier from the server device to the media device, the media device in response to receiving the retrieved media item identifier, requesting overlay content from an overlay decision engine for display on a viewer in communication with the media device.

7. The method of claim 6, wherein a number of frame fingerprints within each corresponding target block of the target frame fingerprints corresponds to a number of the frame fingerprints in the input set of hashed frame fingerprints.

8. The method of claim 6, wherein determining the corresponding rank distance from the input set of hashed frame fingerprints and each of the retrieved target blocks of target frame fingerprints comprises calculating a sum of an absolute difference between ordinal values of respective hashed frame fingerprints of the input set and the target frame fingerprints for each retrieved target block.

9. The method of claim 6, further comprising:
when retrieving the media item identifier from the database, retrieving, by the server device, a frame number for the most recent target frame fingerprint from the target block of target frame fingerprints associated with the shortest rank distance; and
when sending the retrieved media item identifier, sending the frame number for the most recent target frame fingerprint to the media device.

10. The method of claim 6, where the media item comprises a video or television program.

11. An automatic content recognition (ACR) system comprising a non-transitory computer-readable medium storing instructions and a processing device configured to execute the instructions, the executed instructions causing the processing device to perform operations comprising:
storing frame fingerprints of a plurality of media items ordered sequentially by frame number within a database of the non-transitory computer-readable medium;
storing a plurality of (key, value) pair entries within a hash table of the non-transitory computer-readable medium, each entry including a hashed frame fingerprint and one or more index numbers, each index number mapping the hashed frame fingerprint to a corresponding index slot in the database;
receiving an input set of hashed frame fingerprints of an unidentified media item from a media device in communication with the processing device, the hashed frame fingerprints ordered chronologically by frame number in the input set;
identifying a most recent hashed frame fingerprint in the input set of hashed frame fingerprints;
querying the hash table using the most recent hashed frame fingerprint to identify a plurality of index numbers from the (key, value) pair entry of the hash table that matches the most recent hashed frame fingerprint;
for each identified index number, retrieving a corresponding target block of target frame fingerprints from the database, the target frame fingerprints ordered chronologically by frame number and comprising a most recent target frame fingerprint and one or more preceding target frame fingerprints ordered sequentially backwards in time from the most recent target frame fingerprint, the most recent target frame fingerprint having an index slot in the database corresponding to the identified index number;
determining a corresponding rank distance from the input set of hashed frame fingerprints and each of the retrieved target blocks of target frame fingerprints;
retrieving a media item identifier from the database for the target block of target frame fingerprints associated with a shortest rank distance from the input set of hashed frame fingerprints, the retrieved media item identifier identifying the media item associated with the input set of hashed frame fingerprints; and
sending the retrieved media item identifier to the media device via the network interface, the media device in response to receiving the retrieved media item identifier, requesting overlay content from an overlay decision engine for display on a viewer in communication with the media device.

12. The non-transitory computer-readable medium of claim 11, wherein a number of frame fingerprints within each corresponding target block of the target frame fingerprints corresponds to a number of the frame fingerprints in the input set of hashed frame fingerprints.

13. The non-transitory computer-readable medium of claim 11, wherein determining the corresponding rank distance from the input set of hashed frame fingerprints and each of the retrieved target blocks of target frame fingerprints comprises calculating a sum of an absolute difference between ordinal values of respective hashed frame fingerprints of the input set and the target frame fingerprints for each retrieved target block.

14. The non-transitory computer-readable medium of claim 11, wherein the operations further comprise:
when retrieving the media item identifier from the database, retrieving a frame number for the most recent target frame fingerprint from the target block of target frame fingerprints associated with the shortest rank distance; and
when sending the retrieved media item identifier, sending the frame number for the most recent target frame fingerprint to the media device.

\* \* \* \* \*